United States Patent [19]

Soshi et al.

[11] Patent Number: 4,987,434
[45] Date of Patent: Jan. 22, 1991

[54] CAMERA'S DATA IMPRINTING DEVICE

[75] Inventors: Isao Soshi; Osamu Sato; Teruhiko Naruo, all of Tokyo, Japan

[73] Assignee: Asahi Kogaku Kogyo K.K., Tokyo, Japan

[21] Appl. No.: 391,829

[22] Filed: Aug. 10, 1989

[30] Foreign Application Priority Data

Aug. 25, 1988 [JP] Japan .......................... 63-111435[U]
Apr. 14, 1989 [JP] Japan .......................... 1-94714

[51] Int. Cl.$^5$ .................................................. G03B 17/24
[52] U.S. Cl. ..................................... 354/106; 354/434; 354/476; 354/127.1
[58] Field of Search ............... 354/106, 476, 413, 412, 354/416, 419, 429, 432, 433, 434, 127.1

[56] References Cited

U.S. PATENT DOCUMENTS

| | | | |
|---|---|---|---|
| 4,453,814 | 6/1984 | Satoh et al. | 354/106 |
| 4,702,580 | 10/1987 | Denner | 354/106 |
| 4,862,206 | 8/1989 | Ootsuka et al. | 354/414 |

FOREIGN PATENT DOCUMENTS

0263351 4/1988 European Pat. Off. .
1590084 5/1981 United Kingdom .

Primary Examiner—L. T. Hix
Assistant Examiner—Cassandra C. Spyrou
Attorney, Agent, or Firm—Sughrue, Mion, Zinn, Macpeak & Seas

[57] ABSTRACT

A data imprinting device for a camera is provided which imprints symbolic data on a part of a photographing film. The data imprinting device comprises an object luminance photometric sensor for detecting luminance of an object in the vicinity of a symbolic data imprinting area, and a light emitting means including a light source for imprinting symbolic data in a photographing film. The brightness of the light source is controllable. In addition the device comprises a control means for controlling the brightness of the light source in the light emitting means according to the luminance of the object in the vicinity of the symbolic data imprinting area which is detected by the object luminance photometric sensor. In a second embodiment, the quantity of light emitted by the printing section is controlled according to the relationship between the detected luminance of the symbolic data imprinting area and the detected luminance of the areas other than the symbolic data imprinting area.

8 Claims, 6 Drawing Sheets

CAMERA'S DATA IMPRINTING DEVICE

DETAILED DESCRIPTION OF THE INVENTION

1. Technical Field of the Invention

This invention relates to a data imprinting device for a camera which, in photographing an object, simultaneously imprints symbolic data (information) such as characters indicating, for instance, dates or figures in the photographing film.

2. Description of the Prior Art

Figure 12:
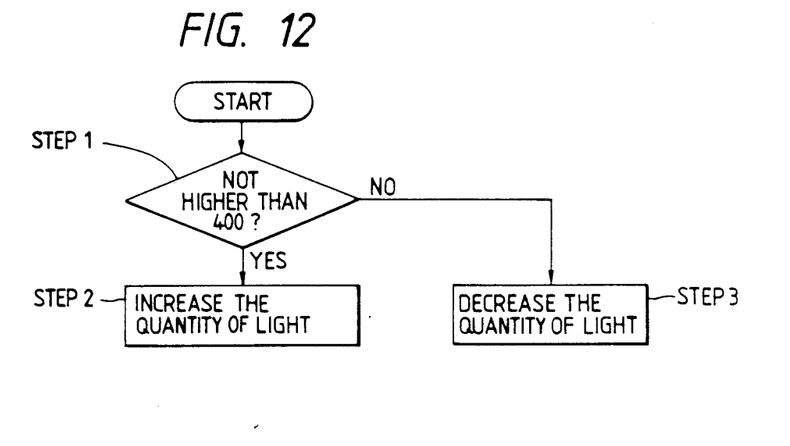
FIG. 12 is a flow chart for a description of the operation of a conventional data imprinting device for a camera.

A data imprinting device of this type has been extensively employed in the art. In one typical example of the conventional data imprinting device, the quantity of light of a light source for imprinting symbol data is changed in two steps depending on the ISO sensitivity of the film. This will be described in more detail. As shown in FIG. 12, when the film ISO sensitivity, is for instance, 400 or less, the quantity of light of the light source is increased while imprinting the symbol data in the film (Steps 1 and 2); and when it is higher than 400, the quantity of light is decreased (Steps 1 and 3), so that the symbol data is imprinted in the film with suitable density.

However, it is difficult to imprint symbolic data in the film with suitable density merely by changing the quantity of light of the light source according to the film ISO sensitivity. In the case where the object exhibits high luminance near the area corresponding to the region of the film where the symbolic data is to be imprinted, the symbolic data will be imprinted with low density. That is, it is rather difficult to read. Similarly, in the case where the object exhibits low luminance, the symbolic data imprinted may be excessively high in density. The possible results are that the symbolic data may be foggy to read, or the area to be shielded may be photographic. That is, the symbolic data imprinted is unclear.

OBJECT OF THE INVENTION

In view of the above-described difficulties accompanying a conventional data imprinting device for a camera, an object of the invention is to provide a data imprinting device for a camera which can imprint symbolic data clearly in the photographing film at all times.

SUMMARY OF THE INVENTION

The present invention has been developed based on the fact that the density of symbolic data imprinted in a photographing film depends greatly on the object luminance of the area where the symbolic data is imprinted as well as the ISO sensitivity of the film, and that the recent advance of photometric technology allows the photometry of only the object luminance in the vicinity of the symbolic data imprinting area.

That is, the specific feature of the invention resides in a data imprinting device for a camera which imprints symbolic data on a part of a photographing film. According to the invention, the data imprinting device comprises an object luminance photometric sensor for detecting the luminance of an object in the vicinity of a symbolic data imprinting area and a light emitting means including a light source for imprinting symbolic data in a photographic film, the brightness of which light source is controllable. The device further comprises control means for controlling the brightness of the light source in the light emitting means according to the luminance of the object in the vicinity of the symbolic data imprinting area which is detected by the object luminance photometric sensor.

In the data imprinting device of the invention, it is preferred that the control means controls the brightness of the light source in the light emitting means according to the ISO data of the film in addition to the luminance of the object in the vicinity of the symbolic data imprinting area.

Furthermore, the specific feature of the invention resides in a data imprinting device for a camera which imprints symbolic data in a part of the photographing film. The data imprinting device for a camera according to the invention comprises a first photometric sensor for detecting the luminance of an object in the vicinity of a symbolic data imprinting area. The device further comprises a second photometric sensor for detecting the luminance of the object in the region which is other than a region detected by the first photometric sensor, and light emitting means including a light source for imprinting symbolic data in a photographing film, the time of emission of which light source is controllable. Also control means is provided for calculating the difference between detection values of the first and second photometric sensors, and for determining the emission time of the light emitting means according to the difference.

DESCRIPTION OF THE PREFERRED EMBODIMENTS

A first embodiment of this invention will be described.

Figure 1:
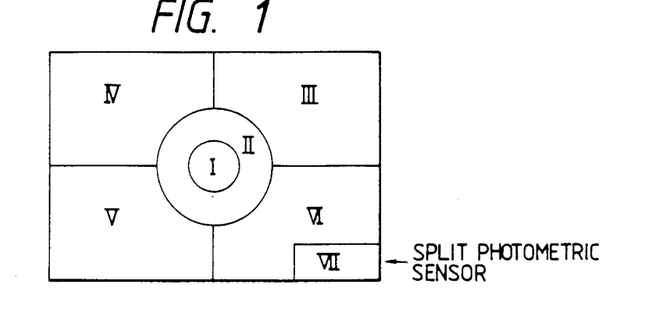
FIG. 1 is a plan view showing one example of split photometric areas in a camera with a data imprinting device according to the present invention.

FIG. 1 shows one example of split photometric areas in a camera provided with a data imprinting device according to this invention. In the embodiment, seven photometric areas I through VII are employed. The photometric area VII is a symbolic data imprinting area located at the lower right corner in FIG. 1. In the data imprinting device of the invention, the intensity of a light source for imprinting symbolic data is controlled according to the output of an object luminance split photometric sensor 2 which detects an object luminance in the symbolic data imprinting area VII.

Figure 2:
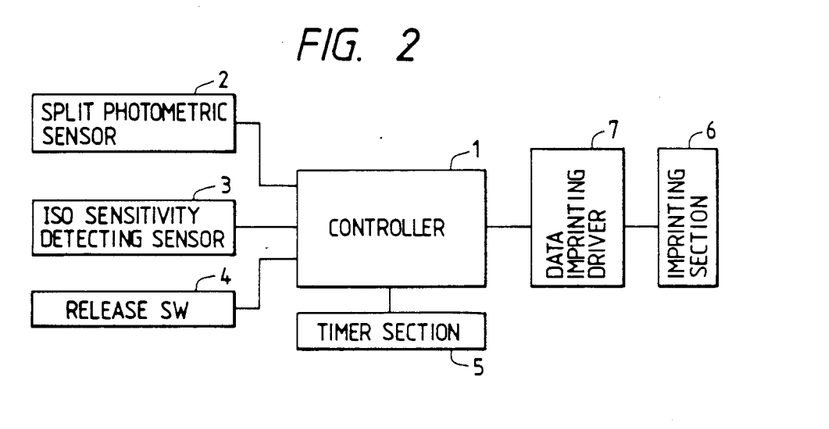
FIG. 2 is a block diagram showing the arrangement of a first example of the data imprinting device according to the present invention.

As shown in FIG. 2, a controller for controlling the timing of imprinting symbolic data in the film and the density thereof is connected to the above-described object luminance split photometric sensor 2, an ISO sensitivity detecting sensor 3 for detecting the ISO sensitivity of the photographing film loaded in the camera, a release switch 4 for outputting a camera photographing start signal, and a timer section 5 for automatically counting the date and time. According to the outputs of these elements, control means, namely, the controller 1 calculates the density of the symbolic data to be imprinted in the photographing film (hereinafter referred to merely as "a film" when applicable). The controller 1 is further connected to a data imprinting driver which drives an imprinting section 6. The imprinting section 6 comprises a light emitting means with a light emitting element for optically applying symbolic data to the symbolic data imprinting area VII. The controller 1 specifies the driving time of the imprinting section 6 and the quantity of light emitted by the light emitting element in the section 6 for the data imprinting driver 7.

Figure 3:
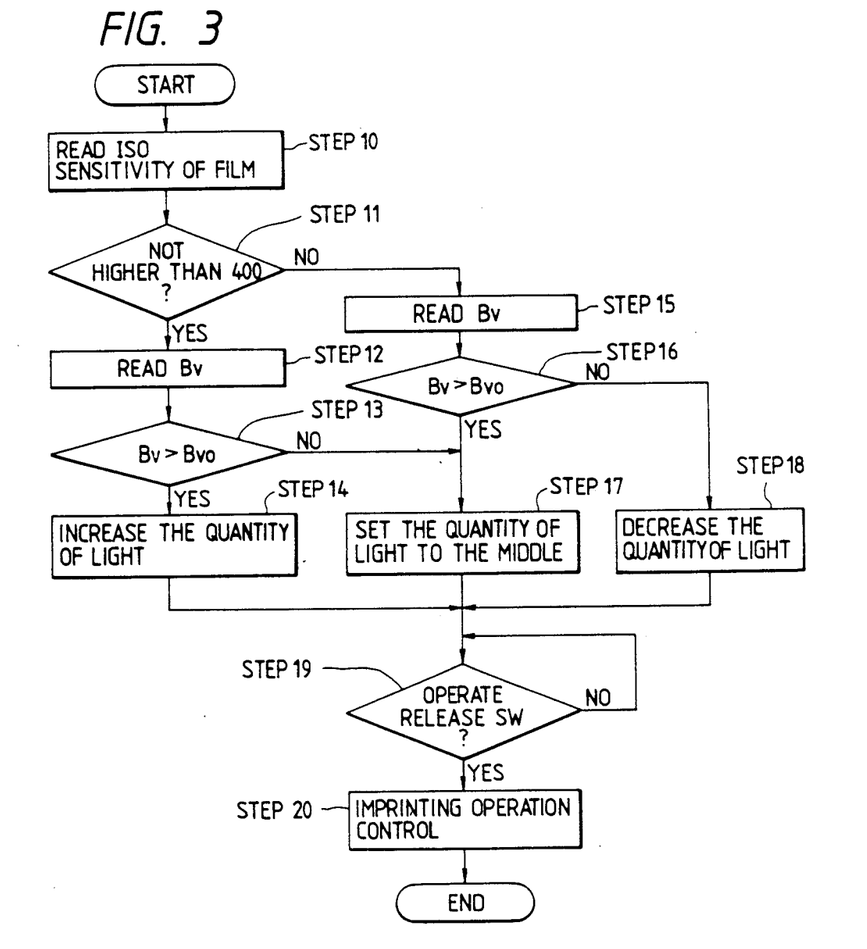
FIG. 3 is a flow chart for a description of the operation of the data imprinting device.

The data imprinting device thus organized operates as shown in a flow chart in FIG. 3.

The controller 1 reads the ISO sensitivity of the film loaded in the camera from the ISO sensitivity sensor 3 (Step 10), and determines whether or not the ISO sensitivity thus read is, for instance, 400 or less (Step 11). If it is lower than 400, then the controller 1 reads the object luminance Bv in the symbol data imprinting area VII from the split photometric sensor 2 (Step 12). If the object luminance Bv is larger than a reference luminance Bvo, the controller 1 applies a signal to the data imprinting driver 7 to increase the quantity of light emitted by the imprinting section (Step 14). If, in Step 11, the ISO sensitivity read is larger than 400, then similar to Step 12, the controller 1 reads the object luminance Bv in the symbolic data imprinting area VII (Step 15), and compares it with the reference value Bvo (Step 16). If the object luminance Bv is larger than the reference value Bvo, the controller 1 applies an instruction signal to the data imprinting driver 7 to set the quantity of light outputted by the imprinting section 6 to about the middle (Step 17). If the object luminance Bv is equal to or less than the reference value Bvo, the controller 1 applies an instruction signal to the data imprinting driver 7 to decrease the quantity of light (Step 18). In the case, too, where in Step 13 the object luminance Bv is equal to or smaller than the reference value Bvo, the controller 1 supplies the instruction signal to the data imprinting driver 7 to set the quantity of light to about the middle value.

Thereafter, the controller 1 determines whether or not the release switch 4 has been operated (Step 19). When it is determined that the release switch 4 has been operated, the controller reads symbolic data such as date and time from the timer section 5, and applies a start instruction to the data imprinting driver to cause the symbolic data thus read to be imprinted in the film (Step 20).

That is, in the case where the film ISO sensitivity is 400 or less, and the object luminance is larger than the reference value, the quantity of light emitted by the imprinting section 6 is increased, so that, even if the symbolic data imprinting area is bright, the symbolic data can be clearly imprinted.

Both in the case where the film ISO sensitivity is equal to or smaller than 400 and the object luminance is equal to or smaller than the reference value, and in the case where the film ISO sensitivity is larger than 400 and the object luminance is larger than the reference value, the quantity of light emitted by the printing section 6 is set to about the middle value, whereby, when the symbolic data imprinting area is not too bright, the symbolic data can be clearly imprinted.

In the case where the film ISO sensitivity is larger than 400 and the object luminance is equal to or smaller than the reference value, the quantity of light is decreased in the imprinting section 6 so that the symbolic data in the symbolic data imprinting area VII may not be excessively bright; that is, it may be clear.

In the above-described embodiment, for simplification in description, the quantity of light emitted by the printing section 6 is changed in three steps. However, it may be changed in more than three steps according to the brightness of the symbolic data imprinting area VII without departing from the scope of the invention.

Furthermore, in the above-described embodiment, the quantity of light is changed with the ISO sensitivity 400 as the threshold value. However, it should be noted that the invention is not limited thereto; that is, the threshold value may be changed differently as the case requires. In addition, the technical concept of the invention is also applicable to the case where no ISO sensitivity is inputted.

Now, a second embodiment of the invention will be described. In the second embodiment, unlike the first embodiment in which the quantity of light emitted by the printing section is controlled through the comparison of the object luminance to the predetermined reference value, the quantity of light emitted by the printing section is controlled according to the relationship between the detection luminance of the symbolic data imprinting area and that of the areas other than the symbolic data imprinting area.

Figure 4:
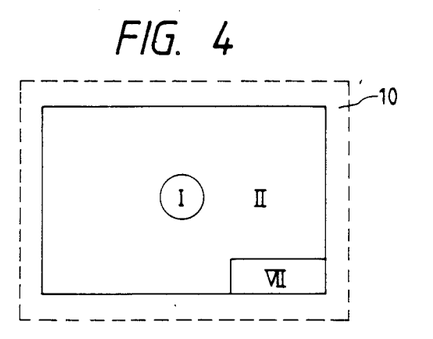
FIG. 4 is a plan view showing another example of the split photometric areas in the camera equipped with the data imprinting device according to the present invention.

FIG. 4 shows one example of split photometric areas in a camera provided with a data imprinting device which is the second embodiment of the invention. In the embodiment, three photometric areas I, II and VI are employed as shown in FIG. 4, and in these areas the luminance of an object in a photographing screen 10 is subjected to split photometry. The photometric area VII is a symbolic data imprinting area located at the lower right corner in FIG. 4.

Figure 5:
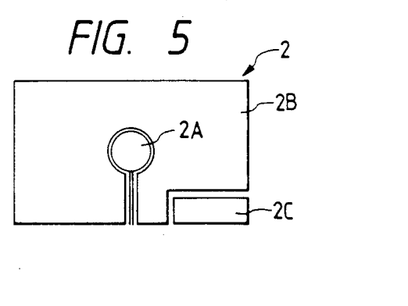
FIG. 5 is a plan view showing light receiving elements for detecting the luminance of an object in the split photometric areas shown in FIG. 4.
Figure 6:
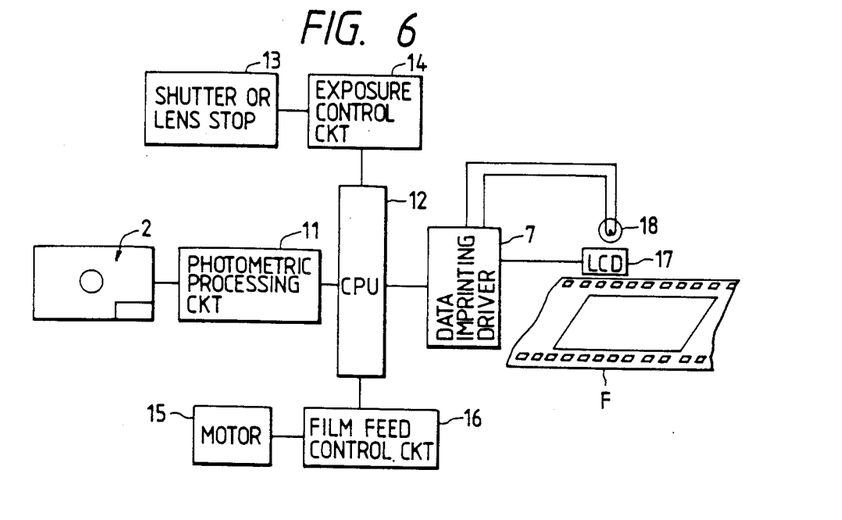
FIG. 6 is a block diagram showing the arrangement of another example of the data imprinting device according to the present invention.

In these areas, as shown in FIG. 5, the photometry is carried out by first photometric means comprising light receiving elements 2A and 2B, and by second photometric means comprising a light receiving element 2C. These light receiving elements form a split photometric sensor 2 as shown in FIG. 6, which is connected to a photometric processing circuit 11, where the object luminance in the above-described three areas are applied to control means, namely, a CPU 12. According to the data, the CPU 12 controls the operation of a data imprinting driver 7. The CPU incorporates the timer section of the first embodiment described above. The CPU 12 is connected to an exposure control circuit 14 for driving the shutter and/or lens stop 13, and to a film feed control 16 for controlling the operation of an electric motor 15 adapted to feed a photographing film, so that it controls exposure according to the data on the object luminance processed by the photometric processing circuit 11.

The data imprinting driver 7 is connected to an LCD 17 which generates characters according to the data on the date and time provided by the timer section incorporated in the CPU 12, and to a lamp 18 which irradiates the characters thus generated to project them on the film F. The data imprinting driver 7, according to an instruction from the CPU 12, controls the characters displayed on the LCD 17 or the time of emission of the lamp 18. The data imprinting driver 7, the LCD 17 and the lamp 18 form light emitting means.

Figure 7:
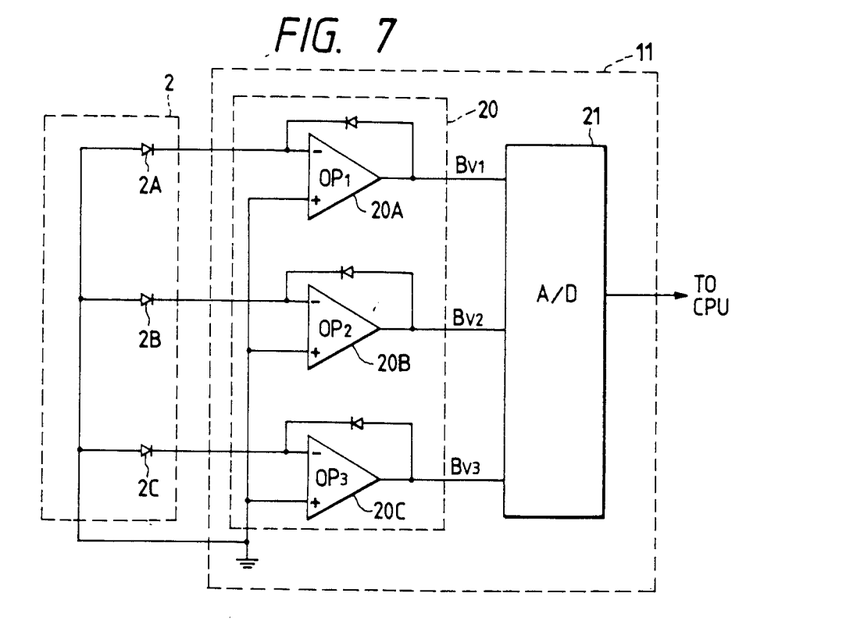
FIG. 7 is a circuit diagram, partly as a block diagram, illustrating a photometric processing circuit shown in FIG. 6.

FIG. 7 is a circuit diagram showing the split photometric sensor 2 and the photometric processing circuit 11 in more detail. The light receiving elements 2A, 2B and 2C output detection signals corresponding to the object luminance in the three areas. The detection signals are amplified by operational amplifiers 20A, 20B and 20C in an amplifier section 20 into the analog voltage signals of the object luminance Bv1, Bv2 and Bv3, respectively. The object luminance signals are applied to an A/D (analog-to-digital) converter 21, where they are converted into digital data. The digital data are applied to the CPU 12, where they are used for arithmetic operation of an exposure value and shutter speed.

Figure 8:
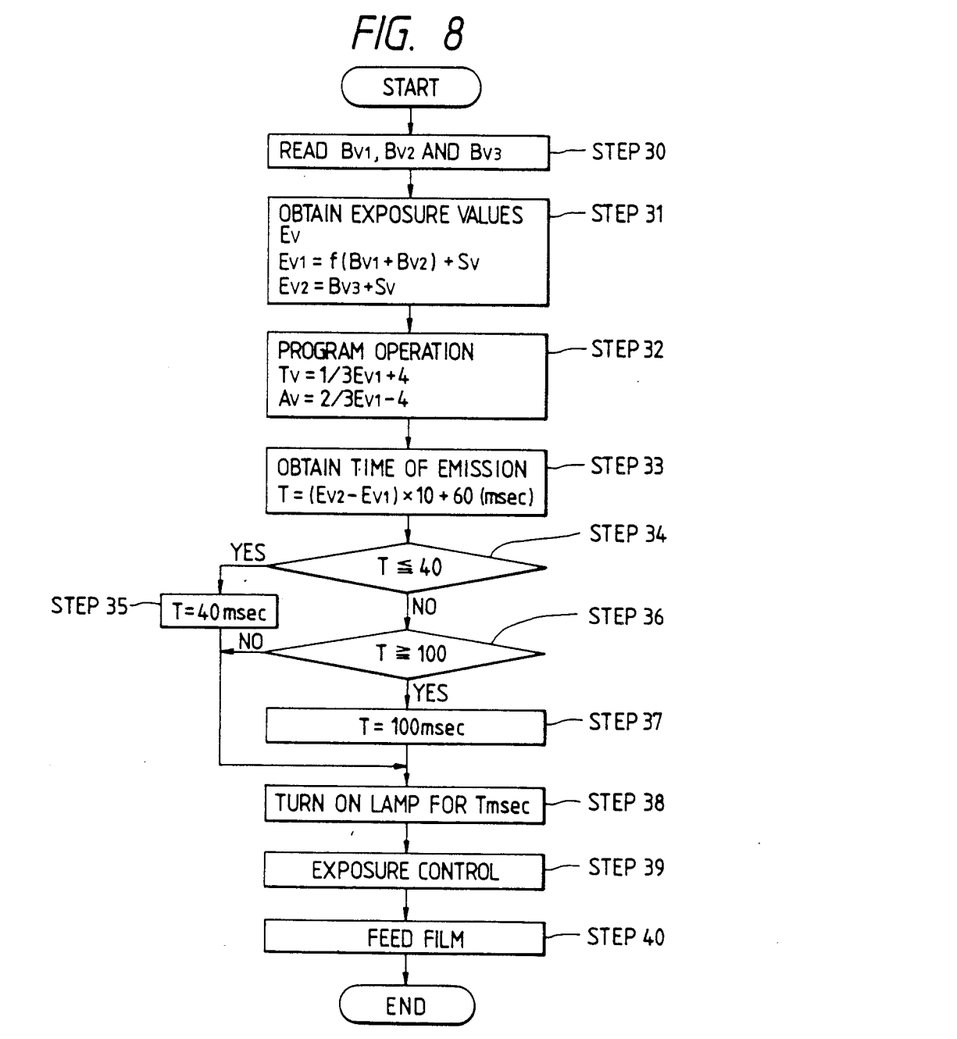
FIG. 8 is a flow chart for a description of the operation of the data imprinting device shown in FIG. 6.

The data imprinting device thus organized operates as shown in a flow chart of FIG. 8.

Upon release of the shutter, the CPU 12 receives the digitized object luminance Bv1, Bv2 and Bv3 from the photometric processing circuit 11 organized as shown in FIG. 7 (Step 30), and calculates an exposure value Ev1 according to the object luminance of the areas other than the symbolic data imprinting area, and an exposure value Ev2 according to the object luminance of the symbolic data imprinting area. More specifically, the exposure value Ev1 is obtained by adding a film sensitivity Sv to the result of the function computation which is carried out by using the object luminance Bv1 and Bv2 detected by the light receiving elements 2A and 2B. The exposure value Ev2 is obtained by adding the film sensitivity Sv to the object luminance Bv3 detected by the light receiving element 2C (Step 31).

Thereafter, the CPU 12 performs a program operation according to the exposure value Ev1, to obtain a shutter speed Tv and an aperture value Av (Step 32). Then, the CPU 12 calculates the time of emission T of the lamp 18 by using the exposure values Ev1 and Ev2 obtained in Step 31. The time of emission T can be obtained according to the following expression (Step 33):

$$(Ev1 - Ev2) \times 10 + 60$$

Figure 9:
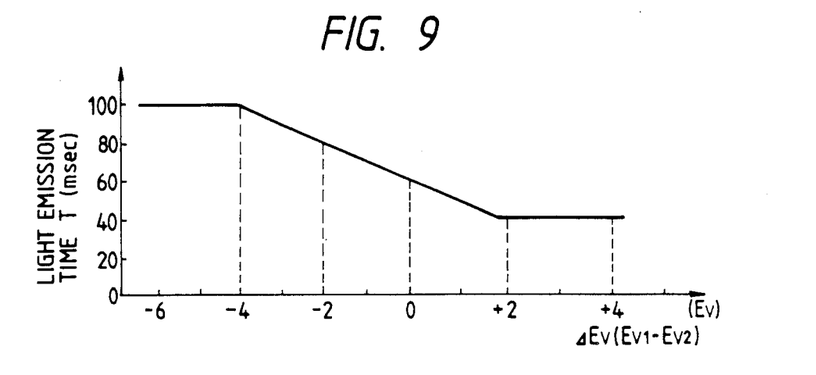
FIGS. 9 and 10 are diagrams for a description of the operation of the data imprinting device of FIG. 6 with respect to light emission time.
Figure 10:
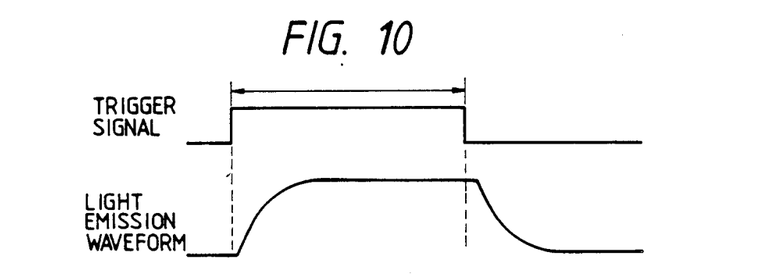

If the time of emission T is equal to or less than 40 msec, then it is set to 40 msec; and if it is equal to or more than 100 msec, it is set to 100 msec. This will become more apparent from FIG. 9. That is, the time of emission is set in a range of from 40 msec to 100 msec according to the value (Ev1−Ev2). When the value (Ev1−Ev2) is in a range of from −4 to +2, the time of emission changes steplessly (Steps 34 through 37). According to the time of emission thus obtained, The CPU 12 applies a lamp emission trigger signal as shown in FIG. 10 to the data imprinting drive 7. In response to the trigger signal, the driver 7 operates to turn on the lamp 18 for the time of emission calculated. In this operation, the light emitted by the lamp shows an indented response waveform as illustrated in FIG. 10 (Step 28).

Figure 11:
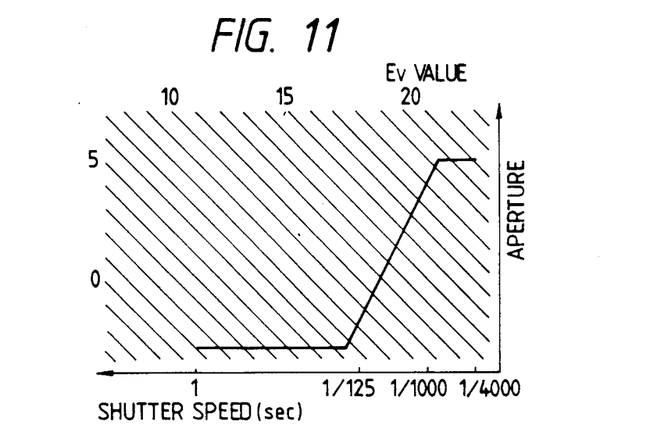
FIG. 11 is a program diagram for exposure computation.

Next, the CPU 12 applies the shutter speed Tv and the aperture value Av obtained in Step 32 to the exposure control circuit 14, The circuit 14 controls the shutter and lens stop 13 according to these values Tv and Av, to release the shutter (Step 39). After this operation, the CPU 12 applies a film feeding signal to the film feeding control circuit 16 to drive the motor 14 thereby to feed the film (Step 40). A program diagram for exposure control in the data imprinting device described above is as shown in FIG. 11.

As was described above, in the embodiment of the invention, the relation between the detected luminance of the symbolic data imprinting area and that of the other area is obtained. When the object luminance of the area where the symbolic data is imprinted is larger than that of the area where the symbolic data is imprinted which is used for exposure computation, the emission time of the lamp for imprinting symbolic data is increased, whereby the symbolic data is imprinted clearly in the film. The time of emission of the lamp is controlled steplessly in the range of from the longest period of time (100 msec) to the shortest period of time (40 msec) which is determined according to the above-described relation between the detected luminance.

In the above-described embodiment, the split photometric sensor comprises three photometric areas. However, the invention is not limited thereto. That is, for instance, a split photometric sensor having two photometric areas may be used, if it is capable of detecting the object luminance of the area where the symbolic data is to be imprinted and the object luminance used for exposure control. In this case, one light receiving element and one amplifier for amplifying the output of the light receiving element can be eliminated.

If a conventional color sensor is employed in which the light receiving element for the symbolic data imprinting area is a PNP junction, then the color of the object in that area can be judged. Therefore, the quantity of light emitted by the lamp can be controlled according to the color thus judged.

EFFECTS OF THE INVENTION

As was described above, in the data imprinting device of the invention, the brightness of the light source for imprinting symbolic data is controlled according to the brightness of the symbolic data imprinting area of the film. Therefore, the symbolic data can be imprinted clearly in the symbolic data imprinting area of the film at all times. When the brightness of the light source is adjusted according to the ISO data of the film in addition to the brightness of the symbolic data imprinting area, then the symbolic data can be imprinted with more suitable density.

Furthermore, in the data imprinting device of the invention, the time of emission by the light source for imprinting symbolic data is adjusted according to the brightness of the symbolic data imprinting area. Therefore, the symbolic data can be imprinted clearly in the symbolic data imprinting area of the film with the most suitable density.

What is claimed is:

1. A data imprinting device for a camera which imprints symbolic data on a portion of a photographing film, comprising:

a first object luminance photometric sensor for detecting a luminance level of an object in the vicinity of a symbolic data imprinting area;

light emitting means including a light source for imprinting symbolic data in a photographing film, the brightness of said light source being controllable; and control means for controlling the brightness of said light source in said light emitting means according to the luminance of said object in the vicinity of said symbolic data imprinting area which is detected by said first object luminance photometric sensor and according to ISO data of said film, wherein said control means increases the brightness of said light source in said light emitting means when said ISO data is less than or equal to a threshold value and when the luminance of said object in the vicinity of said symbolic data imprinting area is greater than a predetermined reference value.

2. A data imprinting device as claimed in claim 1, in which said control means adjusts the brightness of said light source in said light emitting means to a mid-range value when said ISO data is less than or equal to a threshold value and the luminance of said object in the vicinity of said symbolic data imprinting area is less than or equal to a predetermined reference value.

3. A data imprinting device as claimed in claim 1, in which said control means adjusts the brightness of said light source in said light emitting means to a mid-range value when said ISO data is greater than a threshold value and the luminance of said object in the vicinity of said symbolic data imprinting area is greater than a predetermined reference value.

4. A data imprinting device as claimed in claim 1, in which said control means decreases the brightness of said light source in said light emitting means when said ISO data is greater than a threshold value and the luminance of said object in the vicinity of said symbolic data imprinting area is less than or equal to a predetermined reference value.

5. A data imprinting device for a camera as claimed in claim 1, further comprising a second object luminance photometric sensor for detecting a luminance level of said object in a region other than said vicinity of a symbolic data imprinting area, wherein said control means calculates a difference between detected values of said first and second object luminance photometric sensors, and determines an emission time of said light emitting means according to said difference.

6. A data imprinting device for a camera which imprints symbolic data on a portion of a photographing film comprising:

a first photometric sensor for detecting the luminance of an object in the vicinity of a symbolic data imprinting area;

a second photometric sensor for detecting the luminance of said object in a region which is other than a region detected by said first photometric sensor;

light emitting means including a light source for imprinting symbolic data in a photographing film, the brightness of said light source being controllable; and control means for calculating a difference between detected values of said first and second photometric sensors, and for determining the brightness of said light emitting means according to said difference.

7. A data imprinting device as claimed in claim 6, wherein the bright of said light emitting means is controlled by controlling an emission time of said light source.

8. A data imprinting device as claimed in claim 7, wherein said emission time of said light source is relatively longer when said luminance detected by said first photometric sensor is greater than said luminance detected by said second photometric sensor, and said emission time of said light source is relatively smaller when said luminance detected by said first photometric sensor is less than said luminance detected by said second photometric sensor.

* * * * *